United States Patent [19]

Snitzer

[11] Patent Number: 5,457,758
[45] Date of Patent: Oct. 10, 1995

[54] ADD-DROP DEVICE FOR A WAVELENGTH DIVISION MULTIPLE, FIBER OPTIC TRANSMISSION SYSTEM

[75] Inventor: Elias Snitzer, Piscataway, N.J.

[73] Assignee: Rutgers University, Piscataway, N.J.

[21] Appl. No.: 145,390

[22] Filed: Oct. 29, 1993

[51] Int. Cl.$^6$ .............................. G02B 6/00; G02B 6/36
[52] U.S. Cl. ................................................. 385/30; 372/6
[58] Field of Search ........................ 372/6, 37; 385/27, 385/30, 37

[56] References Cited

U.S. PATENT DOCUMENTS

| | | | |
|---|---|---|---|
| 4,737,007 | 4/1988 | Alferness et al. | 385/30 |
| 4,795,226 | 1/1989 | Bennion et al. | 385/30 X |
| 4,955,028 | 9/1990 | Alferness et al. | 372/20 |
| 4,986,624 | 1/1991 | Sorin et al. | 385/30 |
| 5,016,967 | 5/1991 | Meltz et al. | 385/37 |
| 5,123,070 | 6/1992 | Bradley | 372/32 |
| 5,187,760 | 2/1993 | Huber | 372/6 X |

OTHER PUBLICATIONS

All–Fibre Narrowband Reflection Gratings at 1500 nm, R. Kashyap et al. Electronics Lett. vol. 26, May 24, 1990, pp. 730–731
Formation of Bragg Gratings in Optical Fibers by a Transverse Holographic Method, G. Meltz et al., Optics Lett. vol. 14, Aug. 1, 1989, pp. 823–825.
Intermodal Coupler Using Permanently Photoinduced Grating in Two–Mode Optical Fibre, H. G. Park et al. Electronics Lett., vol. 25, Jun. 8, 1989, pp. 797–798.
Narrow–Bandwidth Optical Waveguide Transmission Filters, K. D. Hill et al., Electronics Lett., vol. 23, Apr. 23, 1987, pp. 465–466.
Guided Normal Modes of Two Parallel Circular Dielectric Rods, W. Wijngaard, J. Opt. Soc. Amer., vol. 63, No. 8, Aug. 1973, pp. 944–950.
Cross–talk Fiber–Optic Temperature Sensor, G. Meltz et al., Appl. Optics, vol. 22, Feb. 1, 1983, pp. 464–477.
Magnification of Mask Fabricated Fibre Bragg Gratings by J. D. Prohaska et al., Electronics Lett. vol. 29, No. 18, Sep. 2, 1993, pp. 1614–1615.

*Primary Examiner*—Akm E. Ullah
*Attorney, Agent, or Firm*—Mathews, Woodbridge & Collins

[57] ABSTRACT

Device for use in adding or dropping light signals at predetermined center wavelengths to or from a wavelength division multiplex, fiber optic transmission system. The device includes an evanescent wave coupler having a coupling region formed from two single mode waveguides, the coupling region being formed so that there is substantially complete evanescent field coupling of light from one waveguide to the other in a predetermined wavelength band. Further, the device has a Bragg grating disposed in the coupling region in each of the waveguides.

18 Claims, 3 Drawing Sheets

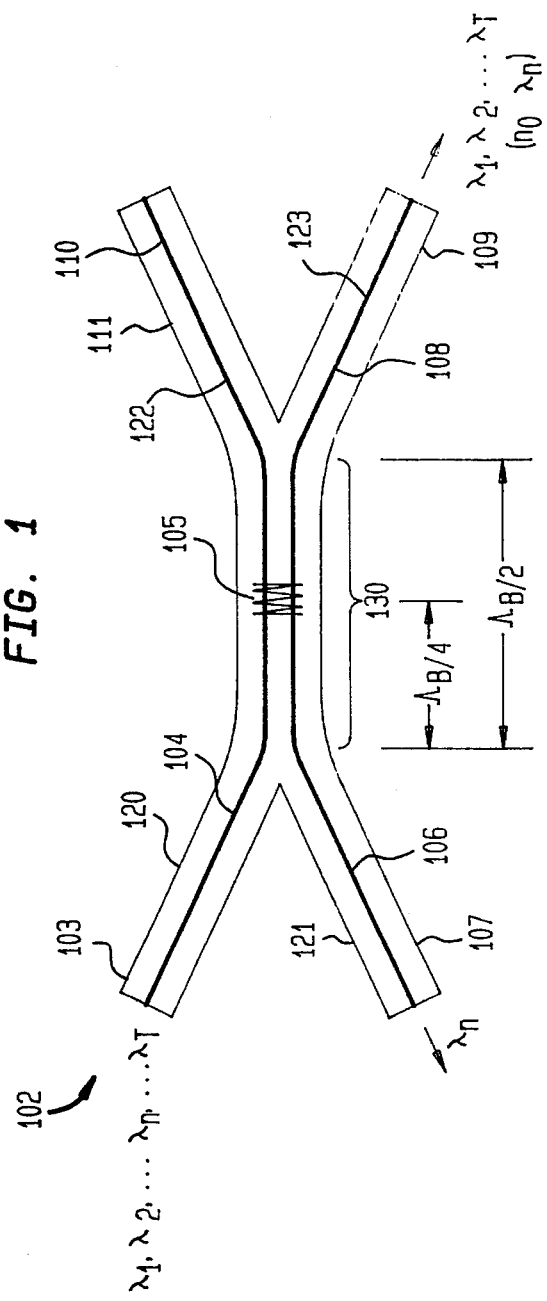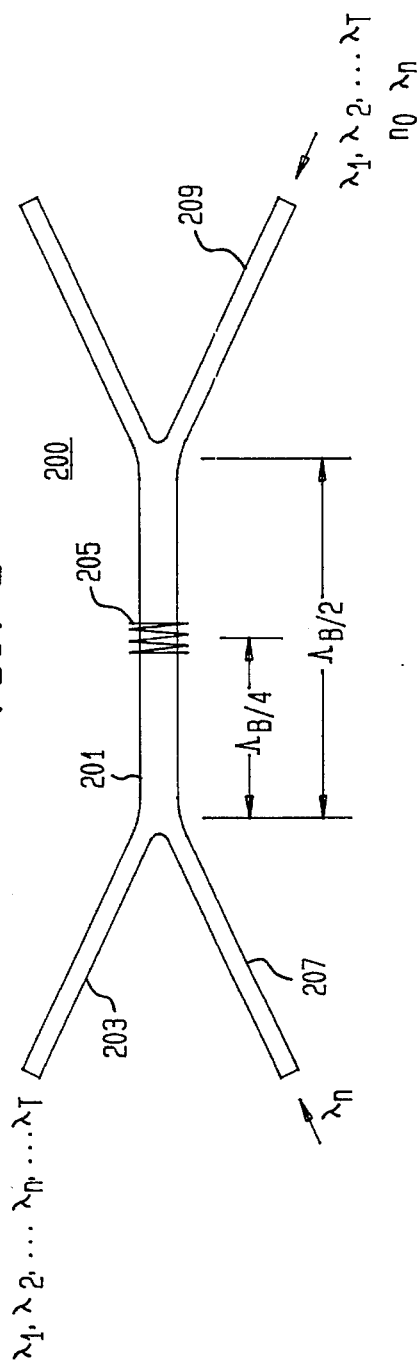

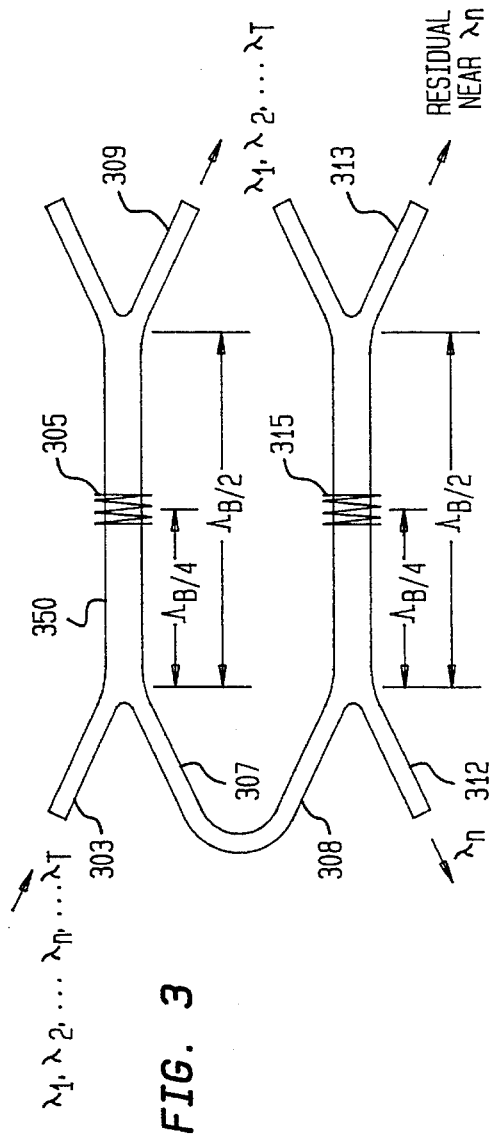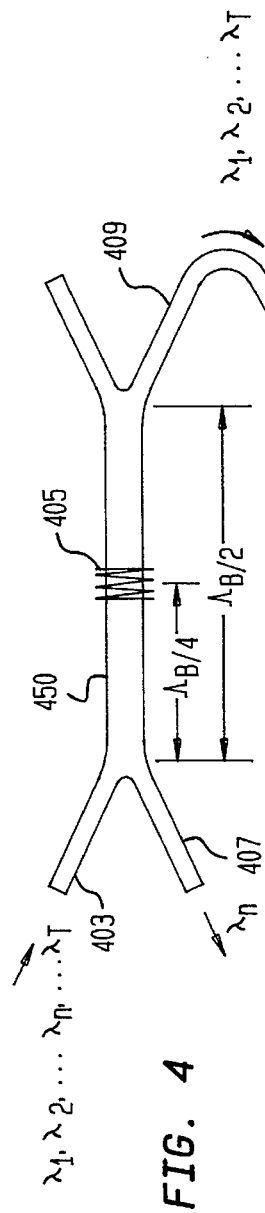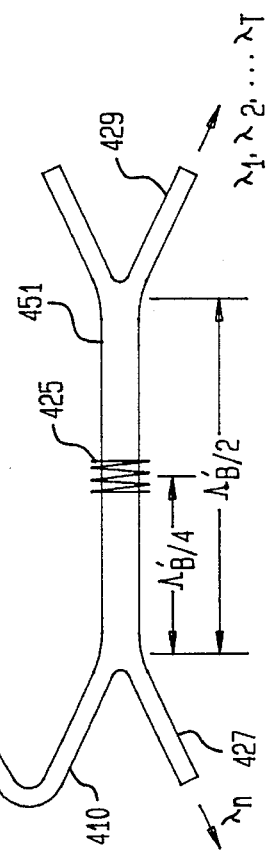
FIG. 3
FIG. 4

5,457,758

ADD-DROP DEVICE FOR A WAVELENGTH DIVISION MULTIPLE, FIBER OPTIC TRANSMISSION SYSTEM

TECHNICAL FIELD OF THE INVENTION

The present invention relates to devices for use in adding or dropping light signals at predetermined center wavelengths to or from a wavelength division multiplex, fiber optic transmission system.

BACKGROUND OF THE INVENTION

The development of Bragg grating reflectors within single mode fibers that are stable and highly selective in wavelength and the demonstration that erbium doped fiber amplifiers (EDFA) are capable of broadband amplification of signals at different, closely space wavelengths, has caused those in the art to consider fabricating a wavelength division multiplex, fiber optic transmission system. However, in order to fabricate such a transmission system, it becomes readily apparent that there is a need for a device for use in adding or dropping a light signal at a predetermined center wavelength to or from such a fiber optic transmission system without disturbing other signals at other wavelengths.

The following describes various devices in the prior art which are candidates for use in fabricating the required add/drop device. A publication entitled "All-Fibre Narrowband Reflection Gratings at 1500 nm" by R. Kashyap, J. R. Armitage, R. Wyatt, S. T. Davey, and D. L. Williams, published in *Electronics Lett.*, vol. 26, 1990, pp. 730–732, discloses a 50%×50%, 2 by 2 fiber coupler which is used to couple signal input at all wavelengths and to extract Bragg reflected light. The device and its method of use are disadvantageous in that there is a loss of at least 75% of the reflected light intensity.

A publication entitled "Formation of Bragg gratings in optical fibers by a transverse holographic method" by G. Meltz, W. W. Morey, and W. H. Glenn, published in *Optics Lett.*, vol. 14, 1989, pp. 823–825, discloses the use of a beam splitter to couple broadband light to a Bragg grating. The device and its method of use are disadvantageous in that the beam splitter attenuates both transmitted light and, even more so, reflected light.

A publication entitled "Intermodal coupler using permanently photoinduced grating in two-mode optical fibre" by H. G. Park and B. Y. Kim, published in *Electronics Lett.*, vol. 25, 1989, pp. 1590–1591, discloses a device in which mode coupler gratings are formed by photorefraction in slightly multimode elliptical fibers. The device is disadvantageous in that the grating periodicity is very large and, as a result, the device is not suitable for use in fabricating efficient wavelength division multiplex components.

A publication entitled "Narrow-Bandwidth Optical Waveguide Transmission Filters" by K. D. Hill, D. C. Johnson, F. Bilodeau, and S. Faucher, published in *Electronics Lett.*, vol. 23, 1987, pp. 465–466, discloses a Sagnac loop reflector device which consists of: (a) a twin core fiber at the input and output of the loop and (b) a Bragg grating in the loop which is used to isolate a narrow band of wavelengths. This device and its method of use are disadvantageous in that a beam splitter or coupler is required to transmit the other wavelengths and this causes light loss. Also, for proper functioning, optic path lengths in the loop have to be controlled to fractions of a wavelength and this is difficult to achieve.

In light of the above, there is a need in the art for a device for use in adding or dropping light signals at predetermined center wavelengths to or from a wavelength division multiplex, fiber optic transmission system which carries signals at other wavelengths, which device overcomes the above-described disadvantages. Further, there is a need for such a device for use in adding or dropping a light signal with minimum loss to the light signal being added or dropped and to light signals at other wavelengths already on the transmission system. Still further, there is a need for such a device for use in adding or dropping which can add or drop a predetermined fraction of the light signal. Yet still further, there is a need in the art for such a device for use in adding or dropping wherein the center wavelength of the light signal which is added or dropped is tunable.

SUMMARY OF THE INVENTION

Advantageously, embodiments of the present invention satisfy the above-identified need in the art and provide a device for use in adding or dropping light signals at predetermined center wavelengths to or from a wavelength division multiplex, fiber optic transmission system which carries signals at other wavelengths. Further, embodiments of the present invention provide an add/drop device for use in adding or dropping the light signal with minimum loss to the light signal being added or dropped and to light signals at other wavelengths already on the transmission system. Still further, alternate embodiments of the present invention provide an add/drop device for use in adding or dropping which can add or drop a predetermined fraction of the light signal. Yet still further, further embodiments of the present invention provide an add/drop device for use in adding or dropping wherein the center wavelength of the light signal which is added or dropped is tunable.

An embodiment of the present invention is a four port device for use in a transmission system having multiple channels, for example, T channels, wherein each channel is carried at a different wavelength. The inventive add/drop device may be utilized to drop channel n at, for example, wavelength $\lambda_n$, by coupling all the signals on a single mode fiber transmission line into port one of the device. Then, in accordance with the present invention, port two will transmit all, or some predetermined fraction, of the light in channel n at wavelength $\lambda_n$ to a single mode fiber coupled thereto. Lastly, ports three and four will transmit light in channels which are at different wavelengths, and whatever residual light at $\lambda_n$ that was not coupled into port number two into single mode fibers coupled to ports three and four. In accordance with the present invention, all of the light in the other channels can be coupled to port three or to port four or in some predetermined ratio divided between ports three and four.

In particular, an embodiment of a first aspect of the present invention comprises a twin core fiber which is comprised of two, substantially identical, single mode fibers which form a coupling region wherein the diameters of the cores and the separation of the cores over an appropriate length are fabricated to provide substantially complete evanescent field coupling of light from one core to the other in a predetermined wavelength band (The length in which evanescent coupling occurs for identical cores and fixed core spacing such that light couples from one core completely to the other core and then back again to the original core will be referred to as a beat length and the beat length will be designated as $\Lambda_B$). The twin core fiber further comprises a Bragg grating in each of the cores in the coupling region.

In a preferred embodiment of the first aspect of the present invention, the length of the coupling region, i.e., the region of the twin core fiber wherein the two cores are separated by an appropriate distance for evanescent coupling, is substantially equal to $\Lambda_B/2$ and the Bragg grating is located substantially at the center of the coupling region, i.e., the center of the Bragg grating occurs at a distance substantially equal to $\Lambda_B/4$ from an end of the coupling region. Thus, embodiments of the first aspect of the present invention comprise a twin core, evanescent wave, coupler fiber having a Bragg grating disposed within a coupling region of a twin core region of the fiber. (Embodiments of the present invention will be referred to below as Bragg-Evanescent-Coupler devices or BEC devices). In preferred embodiments of the present invention, the fibers are fabricated having cores that are photorefractive, for example, by the addition of germania to silica in a silica clad fiber, to advantageously enable photo-fabrication of Bragg gratings.

Embodiments of further aspects of the present invention are fabricated by coupling BEC devices having substantially identical characteristics to provide enhanced selectivity or by coupling BEC devices having different characteristics to provide selective channel adding or dropping. Embodiments of still further aspects of the present invention are tunable BEC devices which utilize means for tuning the length of the evanescent coupling region and/or the characteristics of the Bragg grating. In preferred embodiments of these aspects of the present invention, such means for tuning comprise piezoelectric rings which are disposed about the BEC device or other means such as means for applying stress or temperature changes.

BRIEF DESCRIPTION OF THE FIGURE

FIG. 1 shows, in pictorial form, a device fabricated in accordance with the present invention (a twin core, evanescent wave, coupler fiber having a Bragg grating disposed in the coupling region of the twin core fiber at a predetermined distance from an entrance end thereof) being used to drop a signal at wavelength $\lambda_n$ into a fiber optic transmission line;

FIG. 2 shows, in pictorial form, the device of FIG. 1 being used to add a signal at wavelength $\lambda_n$ to a fiber optic transmission line;

FIG. 3 shows, in pictorial form, a series connection of devices which are fabricated in accordance with the present invention being used to drop a signal at wavelength $\lambda_n$ into a fiber optic transmission line;

FIG. 4 shows, in pictorial form, a series connection of devices which are fabricated in accordance with the present invention being used to drop two signals at two different wavelengths $\lambda_n$ and $\lambda_m$, respectively, into different fiber optic transmission lines;

DETAILED DESCRIPTION

Figure 5:
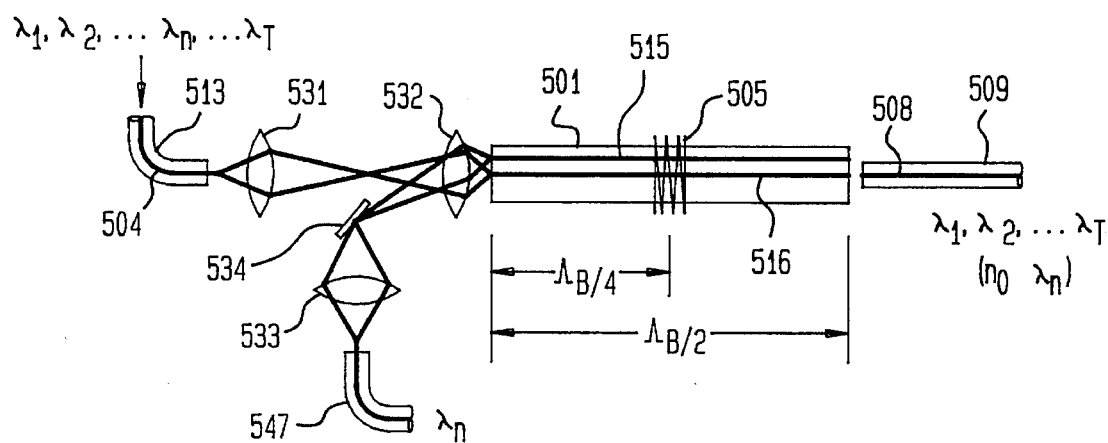
FIG. 5 shows, in pictorial form, an alternative embodiment of a device which is fabricated in accordance with the present invention.

FIG. 1 shows, in pictorial form, device 100 which is fabricated in accordance with the present invention. As shown in FIG. 1, device 100 comprises two substantially identical single mode fibers 120 and 121 having cores 122 and 123, respectively. The diameters of cores 122 and 123 and the separation of the cores in region 130 are fabricated in accordance with methods which are well known in the art so that there is substantially complete evanescent field coupling of light from one core to the other in a predetermined wavelength band (The length in which evanescent coupling occurs for identical cores and fixed core spacing such that light couples from one core completely to the other core and then back again to the original core will be referred to as a beat length and the beat length will be designated as $\Lambda_B$). The length of coupling region 130, i.e., the region of twin core fiber 100 wherein cores 120 and 121 are separated by the appropriate distance for evanescent coupling, is substantially equal to $\Lambda_B/2$. A discussion of evanescent coupling is set forth in a publication entitled "Guided normal modes of two parallel circular dielectric rods" by W. Wijngaard, published in *Journal of the Optical Society of America*, Vol. 63, No. 8, pp 944–950, August 1973. Further, a discussion of twin fiber, evanescent couplers and the fabrication thereof is also set forth in a publication entitled "Cross-talk fiber-optic temperature sensor" by G. Meltz, J. R. Dunphy, W. W. Morey, and E. Snitzer, published in *Applied Optics*, Vol. 22, pp. 464–477, Feb. 1, 1983.

As further shown in FIG. 1, twin core, evanescent wave, coupler fiber 100 comprises Bragg grating 105 which is disposed in each of cores 122 and 123 in coupling region 130 of twin core fiber 100 at a predetermined distance from an entrance end thereof. As still further shown in FIG. 1, Bragg grating 105 is located substantially at the center of coupling region 130, i.e., the center of Bragg grating 105 occurs at a distance substantially equal to $\Lambda_B/4$ from an end of coupling region 130 (Embodiments of the present invention will be referred to below as Bragg-Evanescent-Coupler devices or BEC devices). In a preferred embodiment of the present invention, the fibers are fabricated having cores that are photorefractive, for example, by the addition of germania to silica in a silica clad fiber. This enables one to fabricate a Bragg grating in the coupling region of the twin core fiber in accordance with a method disclosed in a publication entitled "Magnification of Mask Fabricated Fibre Bragg Gratings" by J. D. Prohaska, E. Snitzer, S. Rishton and V. Boegli, published in *Electronics Lett.*, Vol. 29, No. 18, pp. 1614–1615, Sep. 2, 1993.

BEC device 100 is utilized as follows. As shown in FIG. 1, a wavelength division multiplexed set of light signals at wavelengths in the regions of $\lambda_1, \lambda_2, \ldots, \lambda_n, \ldots \lambda_T$ is incident on port one, designated as port 103. A portion of core 122 which receives the input light signals is designated as core 104. Bragg grating 105, disposed at a distance of $\Lambda_B/4$ from an entrance end of evanescent coupler region 130, has a periodicity which causes it to reflect a narrow band of wavelengths in the region of $\lambda_n$. Methods of fabricating Bragg grating 105 having the desired periodicity are well known to those of ordinary skill in the art. Light having wavelengths in the region of $\lambda_n$ are reflected by Bragg grating 105 and, upon traveling back through the distance $\Lambda_B/4$ of coupler region 130, travel into a portion of core 123 designated as core 106 and emerge from port 2, designated as port 107. Advantageously, other wavelengths are not effected by Bragg grating 105 and, when the length of coupler region 130 is substantially equal to $\Lambda_B/2$, all such other wavelengths travel into a portion of core 123 designated as 108 and emerge from port three, designated as port 109.

If the length of coupler region 130 in FIG. 1 is fabricated to be substantially equal to $\Lambda_B$, but the distance from the entrance end of coupler region 130 to Bragg grating 105 is still substantially equal to $\Lambda_B/4$, then light at wavelengths in the region of $\lambda_n$ will still emerge from port two, i.e., port 107, but light at all of the other transmitted wavelengths will travel into a portion of core 122 designated as 110 and will emerge from port four, designated as port 111.

In general, whenever the length of evanescent coupler region 130 is substantially equal to whole multiples of beat length $\Lambda_B$, then transmitted output light will emerge from port four, designated as port 111. Whenever the length of evanescent coupler region 130 is substantially equal to odd multiples of $\Lambda_B/2$, then transmitted output light will emerge from port three, designated as port 109. Lastly, whenever the length of evanescent coupler region 130 is between even or odd multiples of $\Lambda_B/2$, the transmitted output light will be divided between output ports 109 and 111. In order to obtain all of the reflected light traveling in core 106 to port two, Bragg grating 105 must be positioned at a distance from the entrance end of coupler region 130 substantially equal to $[N(\Lambda_B/2)+\Lambda_B/4]$ where N is a positive integer or zero. For wavelengths which are substantially reflected by Bragg grating 105 but where the above-described positioning condition is not satisfied, reflected light will be divided between cores 104 and 106.

In a further embodiment of the present invention, Bragg grating 105 is a partial reflector. In such embodiments, the reflected light is subject to the above-described conditions and the transmitted light behaves in the manner that has been described above for the other transmitted light signals.

FIG. 2 shows, in pictorial form, BEC device 200 which is fabricated in the same manner as device 100 of FIG. 1 is fabricated. As shown in FIG. 2, device 200 is used to add a light signal having wavelengths in the region of $\lambda_n$ to a fiber optic transmission line, i.e., BEC device 200 acts as a combiner or wavelength adding device (Although evanescent coupler region 201 and Bragg grating 205 are shown in FIG. 2, the cores of the fibers are not shown for ease of understanding). As further shown in FIG. 2, light signals having wavelengths in the regions of $\lambda_1, \lambda_2, \ldots, \lambda_T$ enter port 209 and a light signal having wavelengths in the region of $\lambda_n$ enters port 207. In accordance with the present invention, the combined light signal emerges from port 203.

FIG. 3 shows, in pictorial form, an embodiment of the present invention comprised of substantially identical couplers, BEC device 350 and BEC device 351, which are cascaded series. The device shown in FIG. 3 is used to drop a light signal having wavelengths in the region of $\lambda_n$ into a fiber optic transmission line. As shown in FIG. 3, light signals having wavelengths in the regions of $\lambda_1, \lambda_2, \ldots, \lambda_n, \ldots, \lambda_T$ enter port 303 of BEC device 350 and light having wavelengths in the region of $\lambda_n$ enters port 307 of BEC device 350. Then light having wavelengths in the region of $\lambda_n$ enters port 312 of BEC device 351 and residual light having wavelengths near $\lambda_n$ enters port 313 of BEC device 351. The embodiment shown in FIG. 3 advantageously multiplies the reflection characteristic provided to port 307 from Bragg grating 305 of BEC device 350 by the reflection characteristic of Bragg grating 315 of BEC device 351 in providing the final output from port 312 of BEC device 351.

FIG. 4 shows, in pictorial form, an embodiment of the present invention comprised of different couplers, BEC device 450 and BEC device 451, which are cascaded in series. The device shown in FIG. 4 is used to drop a light signal having wavelengths in the region of $\lambda_n$ to a fiber optic transmission line and to drop a light signal having wavelengths in the region of $\lambda_m$ to another fiber optic transmission line. As shown in FIG. 4, light signals having wavelengths in the regions of $\lambda_1, \lambda_2, \ldots, \lambda_n, \lambda_m, \ldots, \lambda_T$ enter port 403 and light having wavelengths in the region of $\lambda_n$ enters port 407 of BEC device 450, i.e., Bragg grating 405 is fabricated to have a periodicity for coupling light having wavelengths in the region of $\lambda_n$ to port 407. As further shown in FIG. 4, the remaining light signals are transmitted from port 409 of BEC device 450 to port 410 of BEC device 451. Then, light having wavelengths in the region of $\lambda_m$ enters port 427 of BEC device 451, i.e., Bragg grating 425 is fabricated to have a periodicity for coupling light having wavelengths in the region of $\lambda_m$ to port 427. The remaining light signals at the remaining wavelengths $\lambda_1, \lambda_2, \ldots, \lambda_T$ are coupled out of BEC device 451 from port 429. As those in the art will readily appreciate, the present invention further includes embodiments comprised of inventive BEC devices which are connected in various reflection and series combinations of FIGS. 3 and 4.

FIG. 5 shows, in pictorial form, an embodiment of inventive BEC device 501 wherein light signals having wavelengths in the regions $\lambda_1, \lambda_2, \ldots, \lambda_n, \ldots, \lambda_T$ are coupled into BEC device 501 and a light signal having wavelengths in the region of $\lambda_n$ is coupled out of BEC device 501 utilizing lenses 531, 532, and 533 and reflector 534. As shown in FIG. 5, light signals having wavelengths in the regions $\lambda_1, \lambda_2, \ldots, \lambda_n, \ldots, \lambda_T$ are coupled from fiber 513 into BEC device 501 by lenses 531 and 532. A light signal having wavelengths in the region of $\lambda_n$ is coupled into fiber 547 by lens 532, reflector 534 and lens 533. Reflector 534 is disposed at the magnified image for lenses 531 and 532 and it is positioned so that it does not obstruct light transmitted between lenses 531 to 532. Lastly, as shown in FIG. 5, the input light signals are coupled to core 516 of BEC 501 and impinge upon Bragg grating 505. Bragg grating 505 is designed to reflect wavelengths in the region of $\lambda_n$. Then, reflected radiation having wavelengths in the region of $\lambda_n$ travels through core 515 towards lens 532 for coupling to fiber 547. Lastly, the remaining light signals in the input are coupled into fiber 509.

It is to be noted that embodiments of the present invention are not limited to BEC devices which are fabricated in a fiber configuration. In fact, it is within the scope of the present invention that BEC devices for use in adding or dropping selected wavelength light channels in wavelength division multiplex communications channels can be fabricated using light waveguides such as those fabricated in a planar, integrated, optic configuration by methods which are well known to those familiar with the art.

Figure 6:
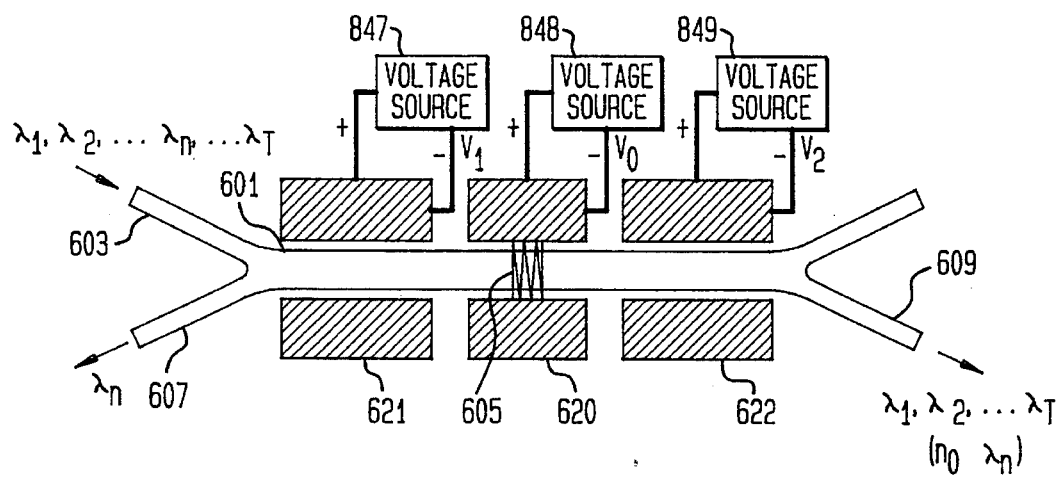
FIG. 6 shows, in pictorial form, a further alternative embodiment of a device which is fabricated in accordance with the present invention which comprises a twin core, evanescent wave, coupler fiber within which a Bragg grating is disposed, which fiber is surrounded by piezoelectric transducers that provide adjustment and tuning of the twin core fiber lengths and the wavelength at which the Bragg grating is reflecting.

Further embodiments of the present invention are tunable BEC devices which utilize means for tuning the length of the evanescent coupling region and/or the characteristics of the Bragg grating. In preferred embodiments of these aspects of the present invention, such means for tuning comprise piezoelectric rings which are disposed about the BEC device or other means such as means for applying stress or temperature changes. FIG. 6 shows, in pictorial form, BEC device 601 which is surrounded by piezoelectric rings 620, 621, and 622. Piezoelectric rings 620–622 operate in a manner which is well known to those in the art in response to voltages $V_0$, $V_1$, and $V_2$ which are applied thereto, respectively, to alter the length and cross section of portions of BEC device 601 which are contained therewithin. Sources of the voltages and means for varying the voltages 847, 848, and 849 shown in FIG. 6 are well known to those in the art. In accordance with the present invention, piezoelectric ring 620 tunes BEC device 601 by changing the periodicity of Bragg grating 605 and, thereby, the wavelength of the reflected light. Similarly, piezoelectric rings 621 and 622 tune BEC device 601 by changing the evanescent portion of BEC device 601 without affecting the grating, i.e., ring 621 changes the length of BEC device 601 before Bragg grating 605 and ring 622 changes the length of BEC device 601 after Bragg grating 605.

Figure 7:
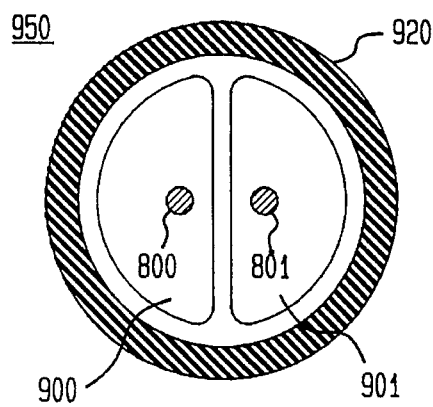
FIG. 7 shows, in pictorial form, a cross section of a preform which is fused and drawn down to appropriate size to form an inventive Bragg-Evanescent-Coupler device (BEC device).

Embodiments of the inventive BEC device can be fabricated as a single fiber having two substantially identical cores disposed therewithin. For example, FIG. 7 shows, in pictorial form, a cross section of a preform which is fused and drawn down to appropriate size to form a BEC device. As shown in FIG. 7, preform 950 is comprised of tube 920, "D" shaped claddings 900 and 901, and cores 800 and 801 disposed within claddings 900 and 901, respectively. Alternatively, embodiments of the present invention can be fabricated by bringing two, separate "D" shaped fibers into contact so that the evanescent fields of the cores interact with one another. For example, the interface between the fibers can be fused or can be contacted using a substance such as oil. In accordance with the present invention, one embodiment is formed by fusing the fibers over a finite length corresponding to, for example, $\Lambda_B/2$. In a preferred embodiment, the twin core region is drawn to a smaller diameter to provide better isolation of the cores in the input and output ports of the BEC coupler.

Those skilled in the art will recognize that the foregoing description has been presented for the sake of illustration and description only. As such, it is not intended to be exhaustive or to limit the invention to the precise form disclosed. Thus, modifications and variations are possible in light of the above teaching which are considered to be within the spirit of the present invention. For example, inventive BEC devices may be fabricated which are comprised of single mode fibers which are not substantially identical. Therefore, it is to be understood that the claims appended hereto are intended to cover all such modification and variations which fall within the true scope and spirit of the invention.

What is claimed is:

1. A device for use in coupling light signals having wavelengths in a region at a predetermined wavelength out of or into a transmission system which carries light signals, the device comprising:

an evanescent wave coupler having a coupling region formed from two single mode waveguides, wherein size and spacing of the waveguides in the coupling region are fabricated having dimensions determined by a condition that the coupling region is sufficiently long for complete evanescent field coupling of light from one waveguide to the other in a predetermined wavelength band, the coupling region has a length which is equal to a distance which provides complete evanescent field coupling of light in the band from one waveguide to the other, which length is referred to as a half-beat-length, said waveguides having a core therein; and a Bragg grating disposed in said core at the center of the coupling region in each of the waveguides, said center of said Bragg grating occurring at a distance equal to one quarter beat length from an end of the coupling region.

2. The device of claim 1 wherein the single mode waveguides are identical.

3. The device of claim 2 wherein the Bragg grating is reflective to light having wavelengths in the coupling region.

4. The device of claim 1 wherein the waveguides are integrated optics waveguides.

5. The device of claim 1 wherein the waveguides are single mode optical fiber waveguides.

6. A device for use in coupling light signals having wavelengths in a region at a predetermined wavelength out of or into a transmission system which carries light signals, the device comprising:

an evanescent wave coupler having a coupling region formed from two single mode waveguides, wherein size and spacing of the waveguides in the coupling region are fabricated having dimensions determined by a condition that the coupling region is sufficiently long for complete evanescent field coupling of light from one waveguide to the other in a predetermined wavelength band, a Bragg grating disposed in said core of the coupling region in each of the waveguides, wherein the coupling region has a length which is equal to even multiples of a distance for complete evanescent field coupling of light from one waveguide to the other in the predetermined wavelength band to occur, which length is referred to as a half-beat-length.

7. A device for use in coupling light signals having wavelengths in a region at a predetermined wavelength out of or into a transmission system which carries light signals, the device comprising:

an evanescent wave coupler having a coupling region formed from two single mode waveguides, wherein size and spacing of the waveguides in the coupling region are fabricated having dimensions determined by a condition that the coupling region is sufficiently long for complete evanescent field coupling of light from one waveguide to the other in a predetermined wavelength band, a Bragg grating disposed in said core of the coupling region in each of the waveguides, wherein the coupling region has a length which is equal to odd multiples of a distance for complete evanescent field coupling of light from one waveguide to the other in the predetermined wavelength band to occur, which length is referred to as a half-beat-length.

8. The device of claim 6 wherein the Bragg grating is positioned at a distance from an entrance end of the coupler region which is equal to N multiplied by the half-beat-length plus one-half of the half-beat-length, where N is a positive integer or zero.

9. The device of claim 7 wherein the Bragg grating is positioned at a distance from an entrance end of the coupler region which is equal to N multiplied by the half-beat-length plus one-half of the half-beat-length, where N is a positive integer or zero.

10. The device of claim 1 which further comprises means for altering the predetermined wavelength band of the coupling region.

11. The device of claim 1 which further comprises means for altering a band of reflective wavelengths of the Bragg grating.

12. The device of claim 10 wherein the altering means comprises piezoelectric means.

13. The device of claim 11 wherein the altering means comprises piezoelectric means.

14. A device for use in coupling light signals having wavelengths in one or more regions at a predetermined wavelength out of or into a transmission system which carries light signals, the device comprising:

a first device comprised of a first evanescent wave coupler having a first coupling region formed from two single mode waveguides, wherein the size and spacing of the waveguides in the first coupling region are fabricated having dimensions determined by a condition that the coupling region is sufficiently long for complete evanescent field coupling of light from one waveguide to the other in a first predetermined wavelength band;

a Bragg grating disposed in the first coupling region in each of the waveguides;

a second device comprised of a second evanescent wave coupler having a second coupling region formed from two single mode waveguides, wherein the size and spacing of the waveguides in the second coupling region are fabricated having dimensions determined by a condition that the coupling region is sufficiently long for complete evanescent field coupling of light from one waveguide to the other in the first predetermined wavelength band; and a Bragg grating disposed in the second coupling region in each of the waveguides;

wherein one of the waveguides from the first device is coupled to one of the waveguides from the second device.

15. The device of claim 14 wherein the Bragg gratings of the first device are reflective to light having wavelengths in a first region and the Bragg gratings of the second device are reflective to light having wavelengths in the first region.

16. The device of claim 14 wherein the length of the first coupling region is equal to a distance which provides complete evanescent field coupling of light in the first predetermined band from one waveguide to the other and the length of the second coupling region is equal to a distance which provides complete evanescent field coupling of light in the first predetermined band from one waveguide to the other.

17. The device of claim 16 wherein:

the Bragg grating of the first device is reflective to light having wavelengths in a first region and the Bragg grating of the second device is reflective to light having wavelengths in the first region; and the one of the waveguides from the first device carries light comprised of wavelengths in the first region.

18. The device of claim 16 wherein:

the Bragg grating of the first device is reflective to light having wavelengths in a first region and the Bragg grating of the second device is reflective to light having wavelengths in a second region; and the one of the waveguides from the first device carries light comprised of wavelengths other than wavelengths in the first region.

* * * * *